J. G. CALLAN.
FLEXIBLE COUPLING.
APPLICATION FILED OCT. 21, 1905.

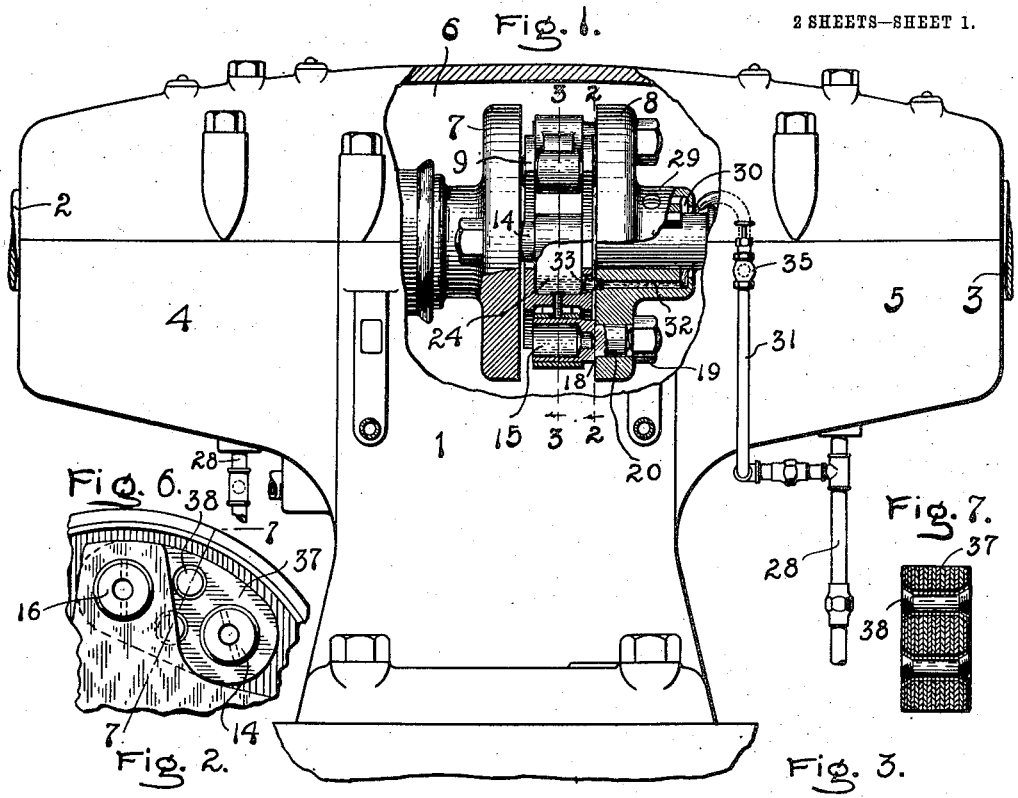
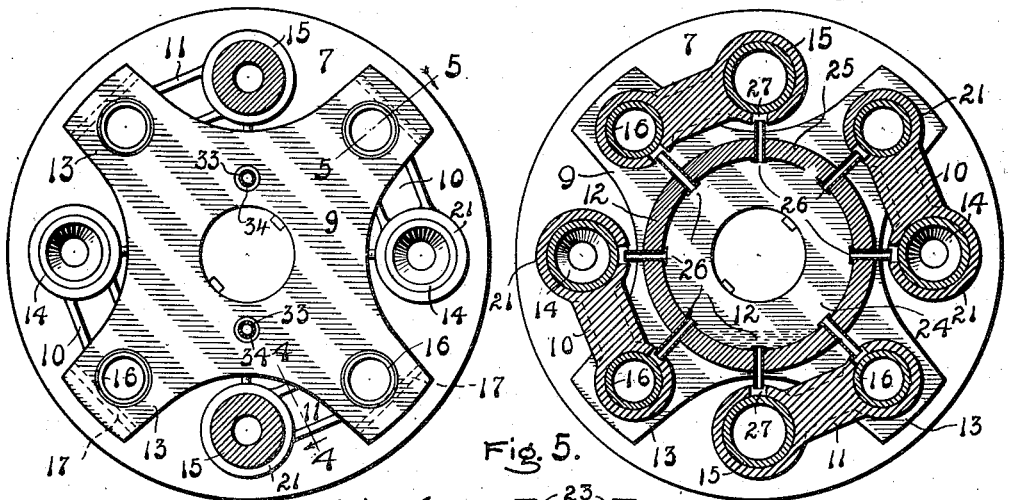

903,171.

Patented Nov. 10, 1908.
2 SHEETS—SHEET 2.

Witnesses:

Inventor,
John G. Callan.
By
Atty.

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

FLEXIBLE COUPLING.

No. 903,171.  Specification of Letters Patent.  Patented Nov. 10, 1908.

Application filed October 21, 1905. Serial No. 283,737.

*To all whom it may concern:*

Be it known that I, JOHN G. CALLAN, a citizen of the United States, residing at Lynn, county of Essex, State of Massachusetts, have invented certain new and useful Improvements in Flexible Couplings, of which the following is a specification.

The present invention relates to a device for flexibly connecting two rotating pieces of apparatus, such for instance, as the shaft of a prime-mover and the shaft of a dynamo-electric machine, a centrifugal pump, a blower, or other apparatus adapted to be driven. Its object is to provide a coupling of simple and substantial construction which will permit of slight eccentricity between the shafts that may be due to some inaccuracy in the shaft bearings, in the shafts themselves, or in both; and which will also permit of a certain degree of endwise movement or end-play. The latter provision is particularly desirable in certain dynamo-electric machines where it is essential to maintain a smooth contact surface for the current-collecting brushes to rest upon, and thus prevent excessive sparking. The coupling is especially applicable to high-speed apparatus, such as turbine-driven machines, and includes means for lubricating the bearings between the relatively movable parts.

The construction of the invention, in one of its embodiments, will be understood from the following description taken with the accompanying drawings, while the features of novelty will be set forth in the appended claims.

Figure 8:
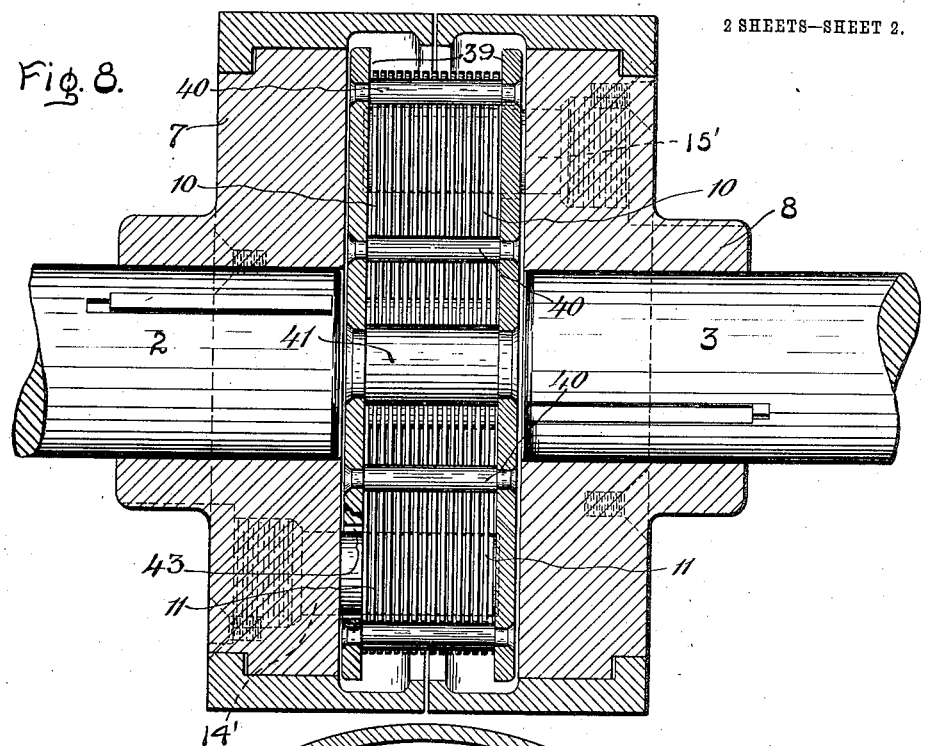
Figure 9:
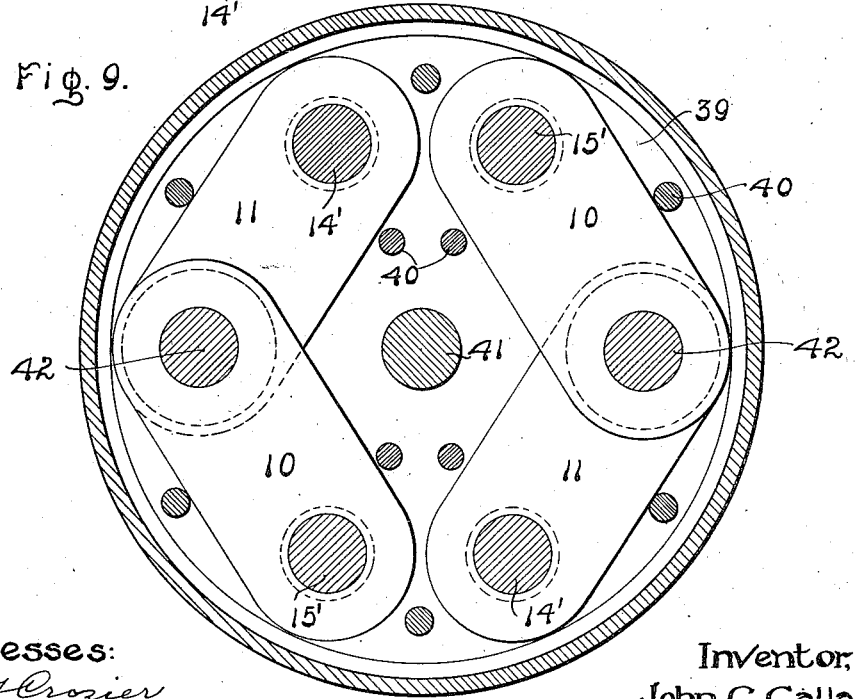

In the accompanying drawings, Figure 1 is a side elevation of a pedestal bearing for the shafts with a portion broken away to show the flexible coupling, the latter being also partly broken away to show certain features of construction; Figs. 2 and 3 are transverse sections of the coupling taken, respectively, on the lines 2—2 and 3—3, Fig. 1, and drawn on an enlarged scale; Figs. 4 and 5 are detail sections taken on lines 4 and 5, Fig. 2; Fig. 6 is a modification of a detail portion of the coupling; Fig. 7 is a section on line 7—7, Fig. 6; and Figs. 8 and 9 are respectively a longitudinal and a transverse section of a modified form of coupling.

Referring to Fig. 1, 1 represents a bearing of the pedestal construction, which supports the adjacent ends of shafts 2 and 3, which for example may be respectively that of an elastic-fluid turbine and an electric generator. The pedestal is provided with overhanging extensions 4 and 5 in which are mounted the bearing sleeves (not shown) for the shafts, and intermediate the extensions is a chamber 6 for containing the shaft coupling. By inclosing the coupling in this chamber, injury to the attendant from contact with the rotating parts is prevented. This arrangement also prevents the throwing of the oil about the room due to the centrifugal action of the rapidly rotating members. The bearing is made in two parts divisible in the horizontal axial plane of the shafts and bolted together. Obviously, other bearing constructions may be employed if desired.

The coupling comprises flanged members 7 and 8, keyed or otherwise secured on the adjacent ends of the shafts 2 and 3, and an equalizing member or floating connector 9 which is connected by separate sets of links 10 and 11 to the members 7 and 8, respectively. The connector is a reel-shaped frame formed with a central portion 12 and transversely extending flanged or disk portions, preferably having radial arms 13 between which the links are disposed. Extending in an axial direction from adjacent surfaces of the flanges 7 and 8 are pivots or pins 14 and 15, to which corresponding ends of the links are attached. They project into the spaces between the radial arms 13, there being preferably as many pivots as there are arms. The pivots or pins are located at equal radial distances, the pivots or pins 14 being diametrically opposite each other, as are also the pivots 15, but the latter are displaced ninety degrees behind the former. The links are connected by pivots or pins 16 to the equalizer or connector. These latter pivots are mounted in the arms of the connector in the same circle containing the pivots 14 and 15. By this arrangement, the center line of the links is tangential to the path of rotation, assuming the parts to be in concentric or normal position; hence the transmission of power from the driving member to the driven member is longitudinally of the links. The axes of the links and the centers of the pivots lie in a common transverse plane between the arms of the flanged portions of the connector, thus reducing the axial dimensions of the coupling to a minimum.

The parts of the coupling are constructed with the aim of securing lightness with the requisite strength. The pivots 16 are tubular and are secured in place in the arms of the connector or equalizer by tangential keys 17, Figs. 2 and 5. The pivots 14 and 15 are made from bar stock and each is bored out for a portion of its length, and the unbored portion is reduced in diameter to form a shoulder 18, Fig. 1, and also threaded to receive a nut 19. The reduced portions are snugly fitted in openings 20 in the flanged members 7 and 8, and are secured therein by the shoulders and nuts. The links are preferably dumb-bell shaped in longitudinal section, Fig. 3, and are provided with hollow cylindrical portions or eyes 21 at their ends to fit on the pivots or pins of the connector and the flanged members. The webs 22 between the portions or eyes 21 are I-shaped in cross-section, Fig. 4, so as to reduce the weight and still give the necessary rigidity.

Referring to Fig. 1, it will be seen that the links are capable of pivotally moving on the pivots 14 and 15 and also moving in a direction axially thereof or lengthwise, thereby permitting relative endwise movement of the shafts. A slight movement is afforded on the pivots 16, as is indicated by the clearance 23 between the links and the arms of the connector, Fig. 5. Couplings of this type may be used with apparatus running at low or high speeds. When operating at high speeds, such as several thousand rotations per minute, the movement of the coupling links relative to the pivots is small but it occurs with every rotation of the coupling and the amount of friction to be relieved is rather great.

In order to adequately lubricate the bearing surfaces between the links and the pivots, a container for lubricant is provided which rotates with the coupling in substantially fixed relation to the bearings and from which lubricant is discharged by centrifugal action to the bearings through suitable conduits. According to the preferred embodiment of this feature the central portion 12 of the connector is made hollow to form a lubricant containing chamber 24, Figs. 1 and 3, and extending from the interior thereof through the cylindrical wall 25 are radial spouts or conduits 26, one of the latter being arranged to extend to each of the bearings between the links and the pivots so as to discharge lubricant thereto. The discharge ends of the spouts or conduits 26 project into openings 27 arranged in the cylindrical portions or eyes 21 of the links, the diameter of the openings being suitably larger than that of the conduits so as to provide for relative movement of the parts without the conduits binding in the openings. The conduits are suitably proportioned to enable the desired quantity of lubricant to be discharged through them to the bearing under the action of centrifugal force. Lubricant may be supplied to the chamber 24 continuously or otherwise, as desired. The supply is preferably taken from the force-feed-lubricating system for the shaft bearings, the supply pipes of which are indicated at 28, Fig. 1. In the boss 29 of flange 8 is an annular chamber or recess 30 into which lubricant is discharged through the pipe 31 that connects with the pipe 28. Extending inwardly from the chamber 30 are two or more conduits 32 extending parallel to the axis through which the lubricant is discharged into the chamber 24 of the connector. Between the conduits 32 and the chamber are short couplings 33 which loosely extend into openings 34 leading into the chamber 24, the clearance between the couplings and the walls of the opening being sufficient to accommodate relative movement of the parts of the coupling. The feed of lubricant through the pipe 31 is controlled by valve 35. The links instead of being constructed as described may be made of laminæ or plates which are more or less loosely secured together in a manner to permit of a limited flexibility in an axial direction. As shown in Figs. 6 and 7, the laminæ 37 which are sheet metal punchings of suitable size and shape, are mounted on the pivots that connect them to the flanges and the connector. At a medial portion the laminæ are loosely bound together by rivets 38, the holes in the laminæ being slightly larger than the rivets so as to permit of individual movement of the laminæ. All of the links may be laminated in this manner, or only one set, as may be desired. Since by this construction, the links are themselves flexible, there is no necessity of providing for axial movement on their pivots, as is desirable in the constructions as hereinbefore described.

In the modification shown in Figs. 8 and 9, the floating connector comprises two spaced disks 39 riveted together by the pins 40 and separator 41. At two diametrically opposite points are arranged pivots 42 for the links, which also serve as separators. One of each pair of links 10 and 11 is secured to each pivot and the opposite ends of the links are secured respectively to the pivots 14' and 15' on the two sections of the coupling. The pivots 14' and 15' extend through openings 43 in adjacent disks of the floating connector and connect with the links. These openings are of larger diameter than the pivots so as not to restrict the free movement of the connector. It will be noted that in this construction all of the links are under tension as distinguished from the arrangement in Fig. 2 where the links 10 are under tension and the links 11 under compression. This modified construction is preferable for laminated links, since they tend to buckle when subject to compression.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. In a shaft coupling, the combination of driving and driven shafts, and a member comprising two rigidly connected disk portions which are spaced apart, with links flexibly connecting the member to the shafts, the links being disposed between the disk portions of the member.

2. In a shaft coupling, the combination of driving and driven shafts, flanged members adapted to be secured to the shafts, pivots extending from adjacent surfaces of the members, a connector or equalizer comprising two spaced disk portions disposed between and parallel to the members, and links on the pivots flexibly connecting the members and the connector which permit of relative endwise movement of the shafts, said links lying in the space between said portions of the connector.

3. In a shaft coupling, the combination of flanged members, a floating connector comprising two spaced and rigidly connected disk portions, pivots carried by the connector which extend parallel to its axis, pivots on the members which extend from adjacent surfaces thereof in overlapping relation to the connector, and links flexibly connecting the pivots of the member with those of the connector.

4. In a shaft coupling, the combination of driving and driven shafts, end members on the shafts, a floating connector comprising two parallel spaced and rigidly connected disk portions, pivots carried thereby which extend parallel to the axis of the connector, pivots on the members which extend from adjacent surfaces of the members in overlapping relation to the connector and its pivots, and a pair of links connecting the pivots of each member with pivots on the connector.

5. In a shaft coupling, the combination of driving and driven shafts, flanged members adapted to be secured to the shafts, links pivotally connected at one end with the members, and means rotating with the coupling which is pivotally connected with the other ends of said links and automatically supplies lubricant to the pivotal connections.

6. In a shaft coupling, the combination of driving and driven shafts, flanged members adapted to be secured to the shafts, links connected at one end with the members, and a connector pivotally connected with the other ends of said links and provided with means so located with respect to the pivotal connections as to feed lubricant to the pivots by centrifugal action.

7. In a shaft coupling, the combination of driving and driven shafts, flanged members adapted to be keyed to the ends of the shafts, a floating connector having a chamber for lubricant centrally located therein, links flexibly connecting the flanged members and the connector, and means coöperating with said chamber to automatically lubricate the bearings between the links and the connector and flanged members.

8. In a shaft coupling, the combination of driving and driven shafts, flanged members adapted to be secured to the shafts, a floating connector between the members, and links connecting the connector and the members, said connector having a container for lubricant which rotates with the coupling and supplies lubricant to the bearings between the relative movable parts.

9. In a shaft coupling, the combination of driving and driven shafts having flanged portions, a floating connector which is provided with a chamber for containing lubricant, means for feeding lubricant from a suitable source outside the coupling to said chamber during the rotation of the coupling, members flexibly connecting said flanged portions with the connector, and means for feeding lubricant from said chamber to the bearings of the members by centrifugal action.

10. In a shaft coupling, the combination of driving and driven shafts, flanged members on the shafts, a floating connector arranged between them which is provided with a chamber, links pivotally connecting said members with the connector at points radially beyond the chamber, and radial conduits between the chamber and the points of pivotal connection of the links which convey lubricant to the said points.

11. In a shaft coupling, the combination of driving and driven shafts, flanged members on the shafts, a floating connector provided with a hollow cylindrical portion to form a lubricant-containing chamber, bearing pins or pivots on the connector and the said members, links extending from the pivots of the connector to those of the members which are provided with openings for receiving lubricant to lubricate the pivots, and lubricant-conveying conduits which extend from the chamber of the connector to the said openings and loosely project into the latter.

12. A coupling for shafts comprising a driving and a driven member, one of the members having means which is adapted to receive lubricant and convey it to a lubricating device during the rotation of the shafts, and flexible connections between the members, one of said connections including in its structure a lubricating device which receives lubricant from said means and feeds it to the points of attachment between the members and the flexible connections.

13. A coupling comprising relatively movable members, and links connected therewith which transmit motion from one member to another, there being means forming a part of one of said members for lubricating the points of connection between the links and the members, and means forming part of another member for supplying lubricant to the first mentioned means while the coupling is rotating.

14. In a shaft coupling, the combination of driving and driven shafts, flanged members on the shafts, there being a chamber in the outer end of one of said members which receives lubricant from a suitable source of supply, a floating connector having a central chamber for lubricant formed therein, conduits between the chambers, links pivotally connecting the members and said connector, and means coöperating with said chambers and conduits for automatically lubricating the points of connection between the links, members and connector.

15. A coupling for shafts comprising a driving and a driven member, there being a recess in one of said members which receives lubricant from a suitable source, means engaging and flexibly connecting the two members, and devices coöperating with said recess to feed the lubricant received by it outward by centrifugal action to the engaging surface of the members and said means.

16. A coupling for shafts comprising driving and driven members, and means engaging and flexibly connecting said members, there being a lubricating device formed in the general coupling structure and rotating therewith which receives lubricant from a suitable source outside the coupling during the rotation thereof and feeds it by centrifugal action to the engaging surfaces of said means and members.

In witness whereof, I have hereunto set my hand this eighteenth day of October, 1905.

JOHN G. CALLAN.

Witnesses:
JOHN A. McMANUS, Jr.,
HENRY O. WESTENDARP.